US009668417B2

(12) United States Patent
Korthuis et al.

(10) Patent No.: US 9,668,417 B2
(45) Date of Patent: Jun. 6, 2017

(54) AGITATED HARVESTER CONVEYOR

(71) Applicant: Oxbo International Corporation, Byron, NY (US)

(72) Inventors: Matthew Korthuis, Bellingham, WA (US); Thomas Vanderwilt, Lynden, WA (US)

(73) Assignee: Oxbo International Corporation, Byron, NY (US)

( * ) Notice: Subject to any disclaimer, the term of this patent is extended or adjusted under 35 U.S.C. 154(b) by 0 days.

(21) Appl. No.: 14/606,631

(22) Filed: Jan. 27, 2015

(65) Prior Publication Data

US 2015/0208581 A1 Jul. 30, 2015

Related U.S. Application Data

(60) Provisional application No. 61/932,636, filed on Jan. 28, 2014, provisional application No. 62/077,021, filed on Nov. 7, 2014.

(51) Int. Cl.
| A01D 46/00 | (2006.01) |
| A01D 46/28 | (2006.01) |
| B07B 1/10 | (2006.01) |
| A23N 15/02 | (2006.01) |

(52) U.S. Cl.
CPC ......... *A01D 46/285* (2013.01); *A23N 15/025* (2013.01); *B07B 1/10* (2013.01)

(58) Field of Classification Search
CPC .. B07B 1/12; B07B 1/286; B07B 1/46; B07B 1/36; B07B 1/42; B07B 9/00; B65G 15/60; B65G 27/00; B65G 27/12; B65G 2812/0312; A01D 45/006; A01D 46/00; A01D 46/005; A01D 46/24; A01D 46/26; A01D 46/28; A01D 51/002
USPC ........... 198/609, 750.8, 766, 833; 209/365.2, 209/366
See application file for complete search history.

(56) References Cited

U.S. PATENT DOCUMENTS

| 2,874,841 | A | * | 2/1959 | Peterson | ................. | B07B 1/286 209/329 |
| 3,236,381 | A | * | 2/1966 | Poynter | .................. | B07B 1/286 198/761 |
| 3,295,301 | A | * | 1/1967 | Looker | ................. | A01D 45/006 171/14 |
| 3,362,524 | A | * | 1/1968 | Holman | ................. | B65G 27/30 198/609 |
| 3,567,012 | A | * | 3/1971 | Mendoza | ............... | B65G 27/00 198/761 |
| 3,584,690 | A | * | 6/1971 | Taylor | .................. | A01D 45/006 171/27 |
| 3,633,677 | A | * | 1/1972 | Walker | ................. | A01D 45/006 171/14 |

(Continued)

FOREIGN PATENT DOCUMENTS

| CN | 203482618 U | * | 3/2014 | ............. | A01D 17/04 |
| CN | 203537842 U | * | 4/2014 | ............. | A01D 33/00 |

(Continued)

*Primary Examiner* — Árpád Fábián-Kovács
(74) *Attorney, Agent, or Firm* — Merchant & Gould P.C.

(57) ABSTRACT

A conveyor system includes a conveyor with openings, a conveyor motor coupled with the conveyor, and an agitator that is configured to impart an agitating motion to the conveyor motor to aid in the separation of materials.

12 Claims, 12 Drawing Sheets

(56) References Cited

U.S. PATENT DOCUMENTS

| | | | | |
|---|---|---|---|---|
| 3,979,891 | A * | 9/1976 | Patton | A01D 46/005 56/328.1 |
| 4,141,203 | A * | 2/1979 | Keillor | A01D 46/24 56/328.1 |
| 4,265,080 | A * | 5/1981 | Goldsmith | A01D 46/28 56/328.1 |
| 4,294,063 | A * | 10/1981 | Bianchi | A01D 45/006 134/68 |
| 4,297,832 | A * | 11/1981 | Alper | A01D 46/00 171/27 |
| 4,428,476 | A * | 1/1984 | Kraus | B65G 27/32 198/764 |
| 4,699,713 | A * | 10/1987 | Tieben | B07B 1/42 209/315 |
| 4,750,322 | A | 6/1988 | Korthuis | |
| 5,045,182 | A * | 9/1991 | Butler | B07B 1/46 209/240 |
| 5,480,353 | A * | 1/1996 | Garza, Jr. | A01D 45/006 171/27 |
| 5,573,459 | A * | 11/1996 | Meester | A01D 45/006 460/145 |
| 5,660,033 | A | 8/1997 | Korthuis et al. | |
| 6,050,073 | A * | 4/2000 | Nevarez, Sr. | A01D 45/263 56/14.4 |
| 6,070,402 | A | 6/2000 | Korthuis et al. | |
| 6,257,978 | B1 * | 7/2001 | Meester | A01D 45/006 460/145 |
| 6,350,198 | B1 * | 2/2002 | Sandei | A01D 45/006 460/123 |
| 6,442,920 | B1 * | 9/2002 | Peterson | A01D 46/26 56/328.1 |
| 6,484,487 | B1 | 11/2002 | Buist et al. | |
| 6,547,661 | B1 | 4/2003 | Ferrandez | |
| 7,166,027 | B2 | 1/2007 | Messenger | |
| 7,275,359 | B2 | 10/2007 | Merant et al. | |
| 8,123,598 | B2 | 2/2012 | Berthet | |
| 2005/0229576 | A1 * | 10/2005 | Flora | A01D 51/002 56/328.1 |
| 2006/0011453 | A1 * | 1/2006 | Sedlacek | B65G 17/24 198/779 |
| 2007/0006563 | A1 * | 1/2007 | Barr | B07B 1/12 56/330 |
| 2008/0236126 | A1 | 10/2008 | Leonini | |
| 2009/0056297 | A1 | 3/2009 | Pellenc et al. | |
| 2010/0223899 | A1 | 9/2010 | Defurne et al. | |
| 2011/0083944 | A1 * | 4/2011 | Bonn | B65G 27/04 198/766 |
| 2011/0108393 | A1 * | 5/2011 | Pax | B65G 27/12 198/750.8 |
| 2011/0253513 | A1 * | 10/2011 | Pax | B65G 27/12 198/750.8 |
| 2012/0234654 | A1 * | 9/2012 | Sandberg | B65G 27/12 198/750.8 |

FOREIGN PATENT DOCUMENTS

| | | | | |
|---|---|---|---|---|
| CN | 204466246 U | * | 7/2015 | A01D 15/04 |
| EP | 216098 A1 | * | 4/1987 | |
| WO | WO 2009/092500 A1 | | 7/2009 | |

* cited by examiner

AGITATED HARVESTER CONVEYOR

CROSS-REFERENCE TO RELATED APPLICATIONS

This application claims priority to Provisional Application Ser. No. 61/932,636, filed Jan. 28, 2014, and Provisional Application Ser. No. 62/077,021, filed Nov. 7, 2014, each of which is incorporated here in its entirety by reference.

TECHNICAL FIELD

The present invention relates to a conveyor system for a harvester having an agitator that connects to the conveyor used for removal of foreign matter remaining mixed in with the products of the harvest of small fruit. The conveyor system applies to harvesting machines as well as processing equipment, and in particular grape harvesting machines and winery processing equipment. The conveyor system may also be used for extracting foreign matter from the products of harvest including raspberries, blueberries, olives, coffee beans, and other small fruits. The conveyor system is described in this application in relation to the processing of grapes onboard a grape harvesting machine.

BACKGROUND

Fruit harvesters and in particular, grape harvesters, are used to mechanically harvest grapes from grape vines. Such harvesters typically include one or more conveyors that collect the grapes loosened from the grape vines and convey the fruit to onboard storage or to other vehicles for transport from the field.

In a conventional harvester, leaves and other light materials with high surface area are separated from individual grapes and grape bunches using fans to discharge the undesirable materials other than grape ("MOG"). A conventional over the row harvester is shown in FIGS. 1A and 1B.

Normally, the use of fans to move air in order to discharge MOG with high surface area provides individual grapes and grape bunches with an acceptably low weight percentage of MOG for further processing in wineries before fermentation. However, sometimes a lower weight percentage or even complete elimination of MOG is desired to minimize or avoid additional processing time before fermentation. In order to achieve a lower weight percentage of MOG, harvesters may be equipped with additional mechanical separation systems on board the harvester. These systems may include, for example, a de-stalker system that loosens grapes from their stalks (also known as the rachis) and discards the stalks, as well as a secondary fine-material sorting system that rejects elements of MOG, such as leaf stalks (also known as petioles). One common method for fine-material sorting on board grape harvesters is a continuous perforated conveyor belt that has appropriately sized mesh openings to allow grapes to fall through the openings while leaving MOG on the surface to be discarded.

These systems operate in a satisfactory manner when the grape load is light and evenly distributed on the conveyor surface, but when heavy loads of grapes are handled, some amount of grapes may fail to pass through the perforated belt, causing a loss of harvested grapes. It would, therefore, be beneficial to provide for a system that provides improved separation of grapes and other materials and minimizes losses of harvested grapes by causing more grapes to pass through the conveyor.

SUMMARY OF THE INVENTION

The present invention relates to a conveyor system for a harvester having a conveyor defining openings spaced across the conveyor and extending through the conveyor, a conveyor motor coupled with and driving the conveyor. An agitator is configured to agitate the conveyor. The agitator imparts a reciprocating agitating motion to the conveyor motor.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF DRAWINGS

Referring now to the drawings, wherein like reference numerals and letters indicate corresponding structure throughout the several views.

DETAILED DESCRIPTION

The present invention relates to a conveyor system and agitator for a fruit harvester, particularly a harvester suitable for harvesting grapes. Grapes can be harvested with an over-the-row harvester that travels over the row of grape vines and harvests grapes by either shaking the trunks of the grape vines or the canopy of the grape vines, causing grapes to fall from the vines. The grapes are collected and conveyed to onboard storage or to another vehicle for transport from the field.

Figure 1A:
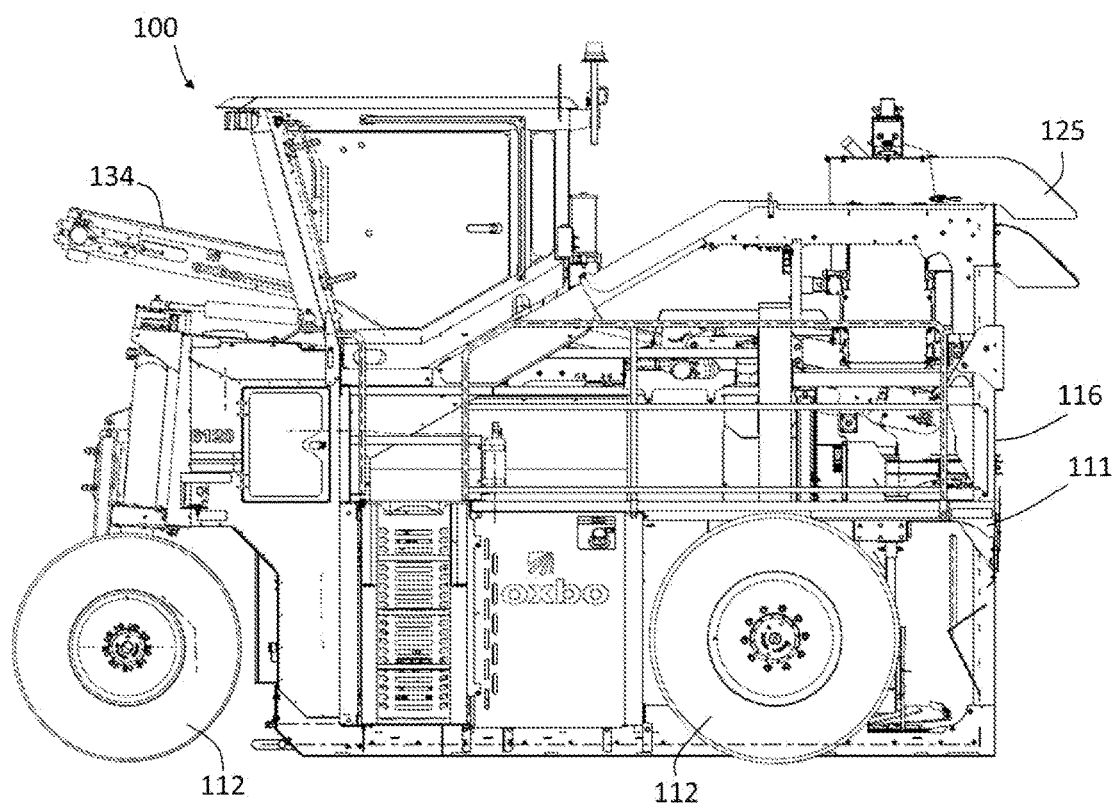
FIG. 1A is a side view of a conventional fruit harvester.
Figure 1B:
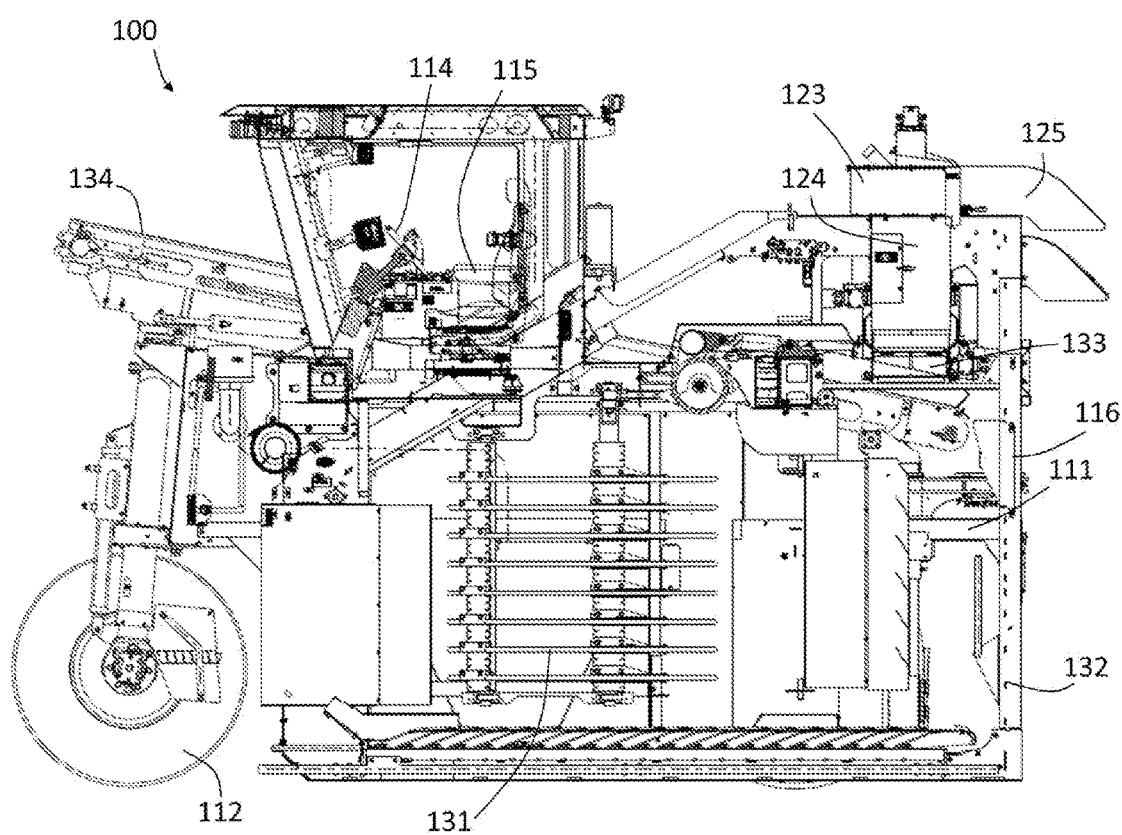
FIG. 1B is a cross sectional view of a conventional fruit harvester.

FIGS. 1A and 1B show an over-the-row harvester 100 typically used to harvest grapes or similar small fruit. The harvester 100 includes a chassis 111 mounted on wheels 112. Over the row harvesters 100 typically have either three or four wheels 112.

As shown in FIG. 1B, the harvester 100 has beaters 131 (or alternatively skis) extending inward from the side of the chassis 111 that engage either side of the grape vines or the trunks of the grape vines as the harvester 100 passes along a row of grape vines. The chassis 111 also has a driver's seat 115 and a steering wheel 114 and controls. The beaters 131 engage the canopy of the grape vines and cause grapes to fall and be collected by a bucket line conveyor 132 or other conveyance mechanism. The bucket line conveyor 132 lifts the harvested grapes and grape bunches along the back wall 116 of the harvester 100 and drops the grapes and grape bunches into an air column 124. A fan 123 (e.g., a suction fan) is positioned adjacent (e.g., above) the air column 124 such that the operation of the fan 123 causes an upward air flow in the air column 124. The upward airflow removes leaves and other light weight debris from the grapes and grape bunches, as the heavier weight grapes and grape bunches fall down through the air column 124. The removed leaves and debris are discharged through one or more exhaust chutes 125.

The harvested grapes and grape bunches fall onto a first fruit conveyor 133 and continue to a second fruit conveyor 134, where the grapes and grape bunches are conveyed to a storage bin that may be towed by a tractor or similar vehicle. Alternatively, harvested grapes and grape bunches may be conveyed to on-board storage bins located on one or both sides of the harvester.

Figure 2A:
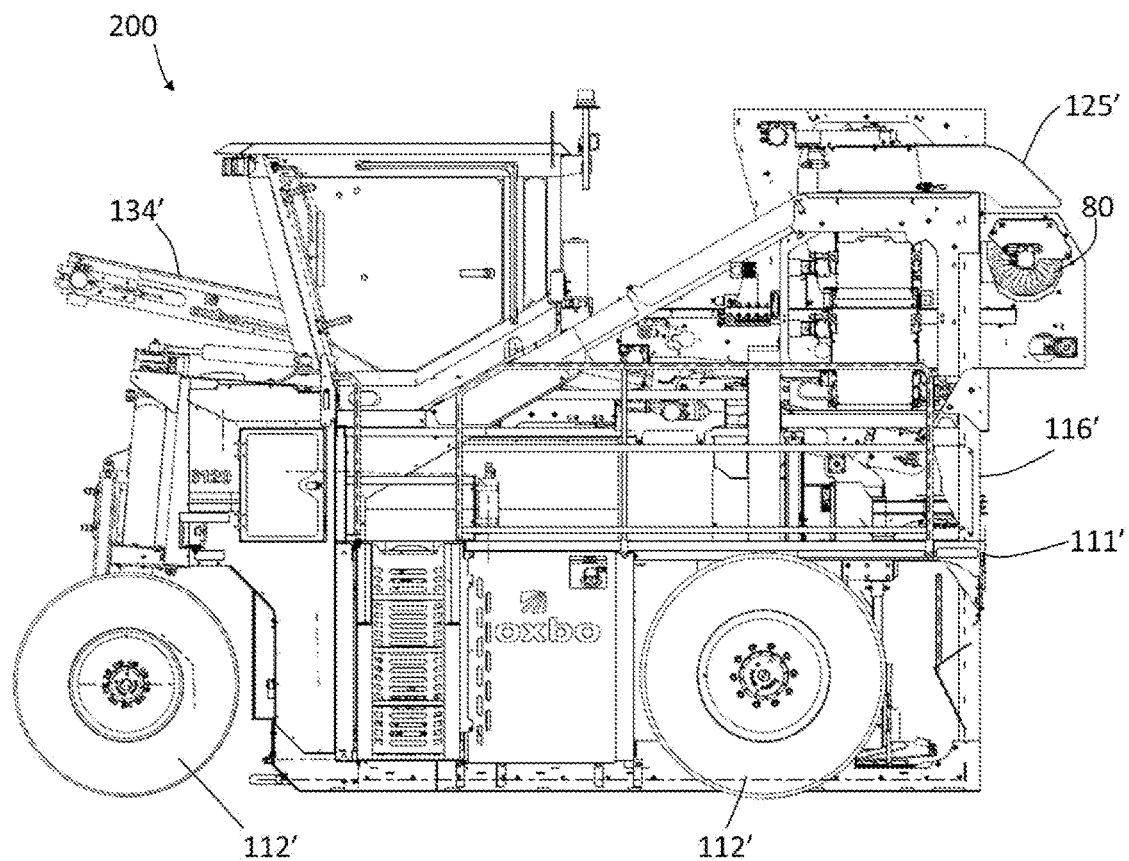
FIG. 2A is a side view of a fruit harvester according to the principles of the present invention.
Figure 2B:
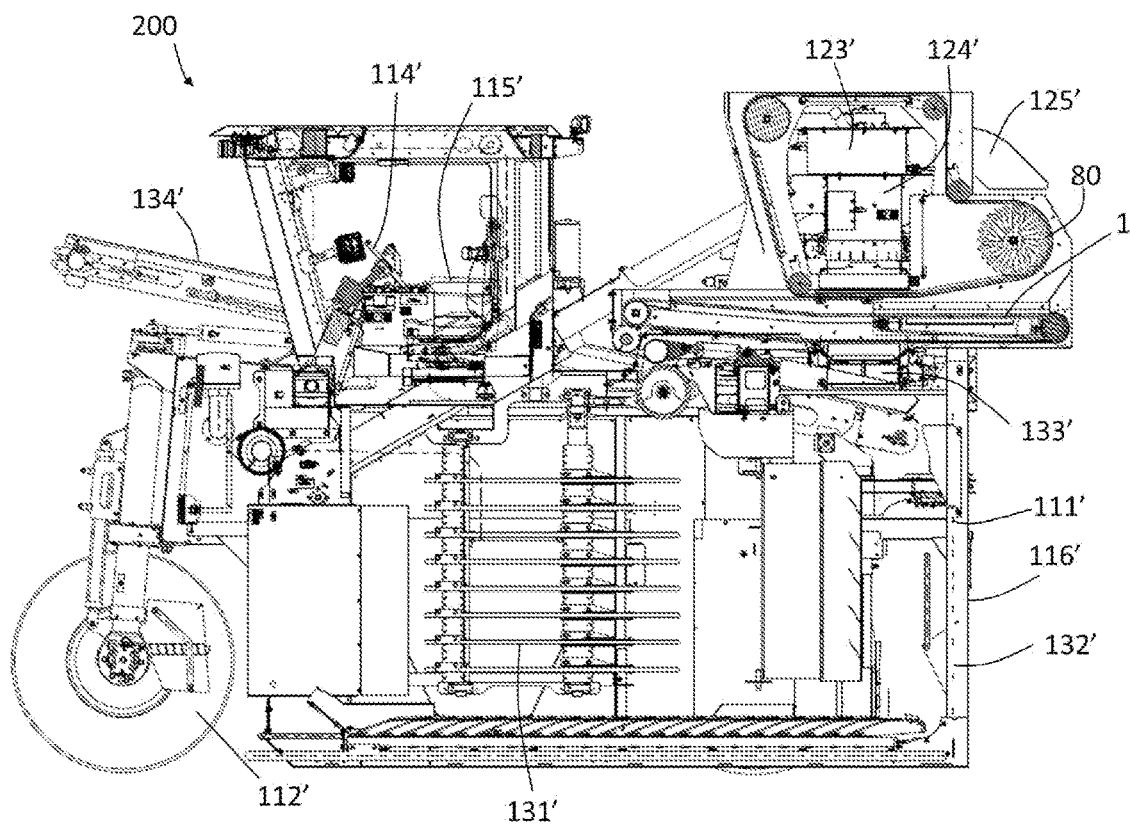
FIG. 2B is a cross sectional view of the fruit harvester of FIG. 2A.

FIGS. 2A and 2B show a harvester 200 with a conveyor system 1 according to an embodiment. Similar reference numerals (e.g., chassis 111 and 111') are used to refer to parts that are the same or similar in the conventional harvester 100 as in the harvester 200 with the conveyor system 1. The grapes and grape bunches are harvested and conveyed like they are in the conventional harvester 100 until the grapes and grape bunches are dropped from the bucket line conveyor 132' into the air column 124'. After the air column 124', however, the grapes and grape bunches are directed to a de-stalker system 80. The de-stalker system 80 loosens up grapes from the grape bunches so that the stalks and other debris can be more effectively separated and removed.

As shown in FIG. 2B, the conveyor system 1 is positioned below the air column 124' and the de-stalker system 80. To accommodate the conveyor system 1, the air column 124' may be shorter than the corresponding air column 124 in the harvester 100. After having been de-stalked, the grapes along with any debris that was not removed in the air column 124' or the de-stalker system 80 fall onto the conveyor system 1 for further cleaning and separation. From the conveyor system 1, the grapes are further conveyed along the first and second fruit conveyors 133' and 134' to a storage bin that may be towed by a tractor or other suitable vehicle. Leaves, twigs and other debris are removed and discarded.

Figure 3:
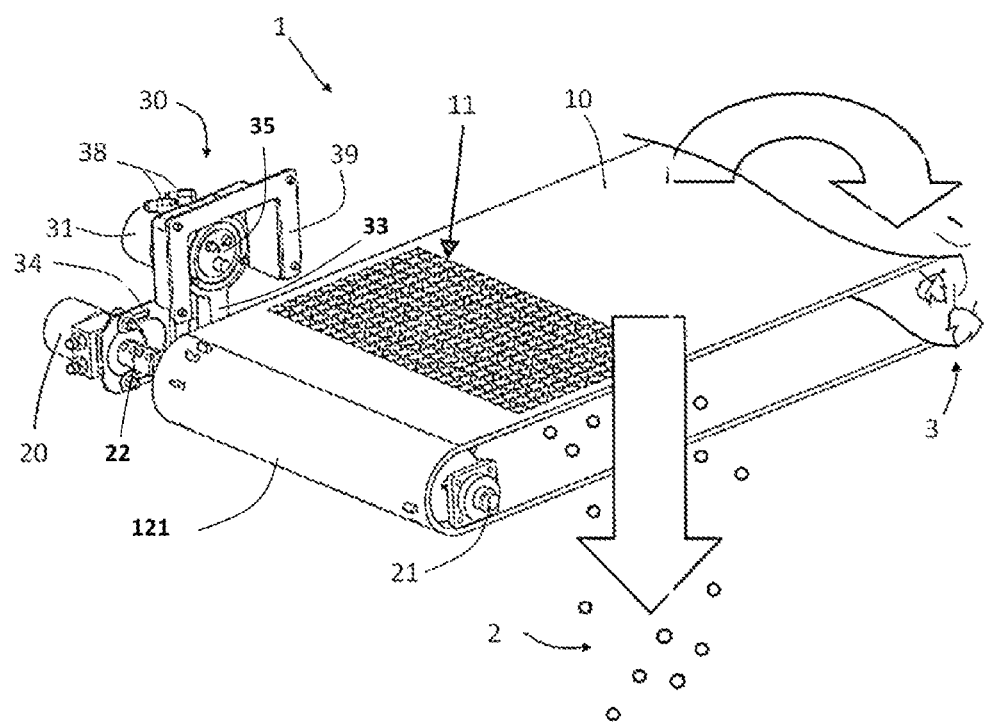
FIG. 3 is a schematic perspective view of a conveyor system according to the principles of the present invention.

Referring now to FIG. 3, a schematic view of the conveyor system 1 is shown. The conveyor system 1 includes a conveyor belt 10. The conveyor belt 10 is not a solid belt. The conveyor belt 10 is configured as connected molded or wireframe type segments defining a first end 121 and a second end 122 (shown in FIG. 5B), and openings 11 that extend through the plane of the conveyor belt 10. The openings 11 are sized so that harvested grapes 2 can fall through the openings 11 in the conveyor belt 10 as the conveyor belt 10 moves along a conveyor belt path. For example, the openings 11 may have a minimum cross diameter of about 16 mm, about 18 mm, about 20 mm, about 22 mm, about 24 mm, about 26 mm, about 28 mm, about 30 mm, about 32 mm, about 35 mm, about 40 mm, or any size therebetween. Leaves, twigs, branches, and other debris (also known as Material Other than Grapes, or "MOG" 3) stay on the belt until the belt turns over at the second end 122 and the MOG 3 is discarded. The separated grapes 2 are collected onto the first fruit conveyor 133' under the conveyor belt 10 as they fall through the openings 11. An auger assembly 50 (shown in FIG. 5B) located at the second end 122 of the conveyor belt 10 discards the MOG 3. A conveyor motor 20 is coupled with the conveyor belt 10 via a belt drive shaft 22 and an axle 21 that turns the conveyor belt 10 in an endless loop between the first end 121 and the second end 122. As can be seen in FIG. 2B, the first end 121 of the conveyor system 1 is located at the back of the harvester 200, the top side of the conveyor belt 10 moving forward toward the second end 122 and toward the front of the harvester 200. However, other conveyor paths are contemplated, depending upon the particular configuration of the harvester. The conveyor belt 10 can be a conventional perforated conveyor belt constructed from any suitable material, such as a polymer (e.g., polyethylene, polypropylene or PVC) or a metal (e.g., steel or aluminum), or combinations thereof. The openings 11, although only shown in a part of the conveyor belt 10, typically continue along the entire length of the conveyor belt 10.

The conveyor system 1 includes an agitator assembly 30. The agitator assembly 30 includes an agitator motor 31 mounted to the chassis 111' of the harvester 200 by a mounting frame 39. The agitator motor 31 is connected to the conveyor motor 20 by a first link 33 (shown in FIGS. 4B and 4C) and a second link 34. The agitator motor 31 may be any suitable type motor, such as a hydraulic motor. The hydraulic agitator motor 31 shown in FIG. 3 is powered by hydraulic fluid through hydraulic connections 38.

Figure 4A:
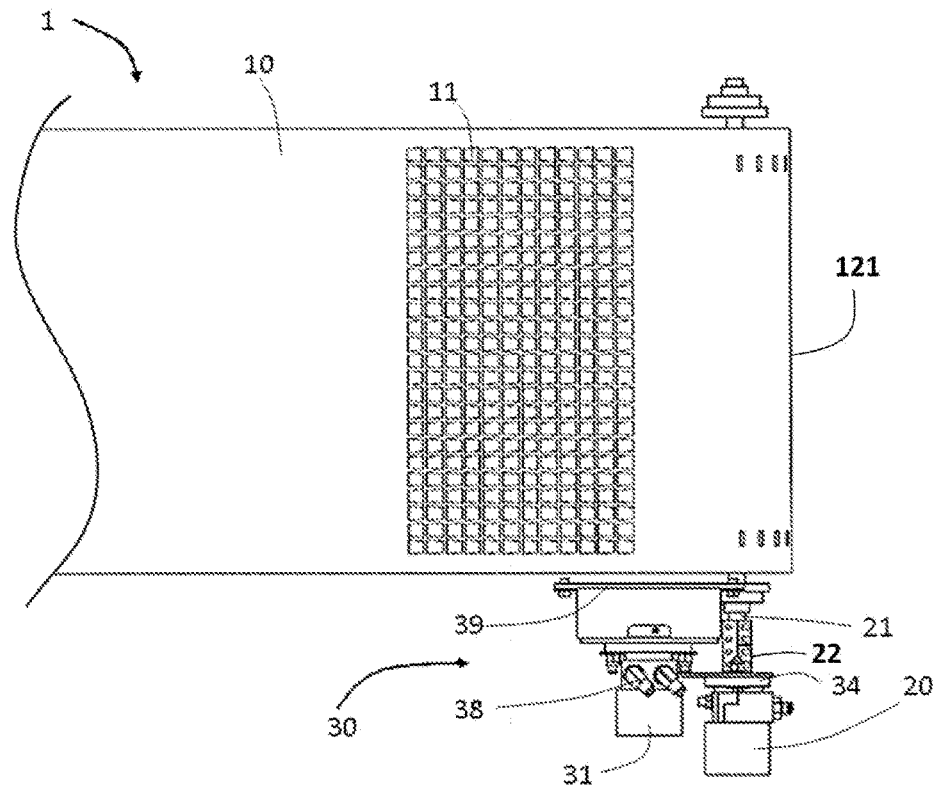
FIG. 4A is a partial top view of the conveyor system of FIG. 3.
Figure 4B:
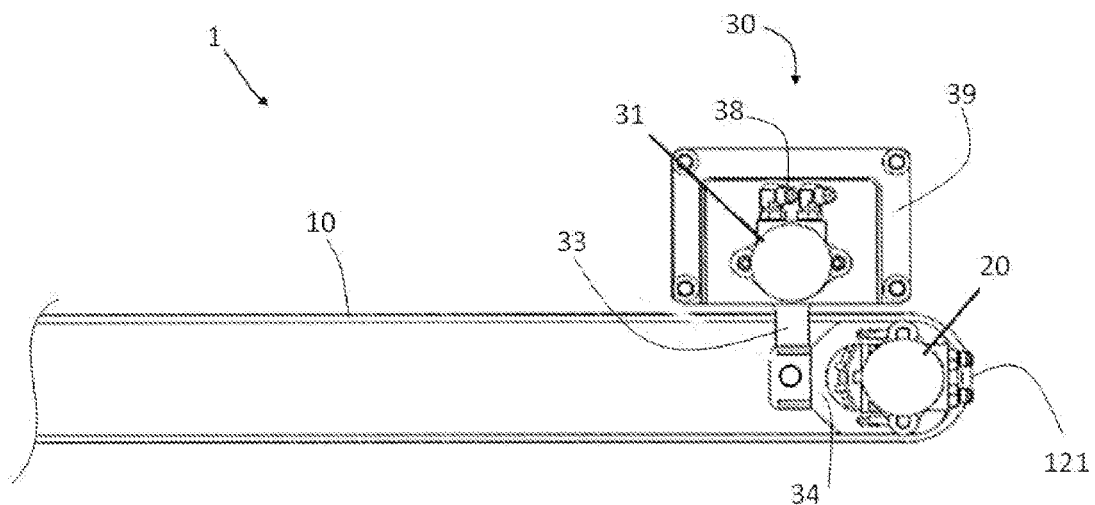
FIG. 4B is a partial side view of the conveyor system of FIG. 3.
Figure 4C:
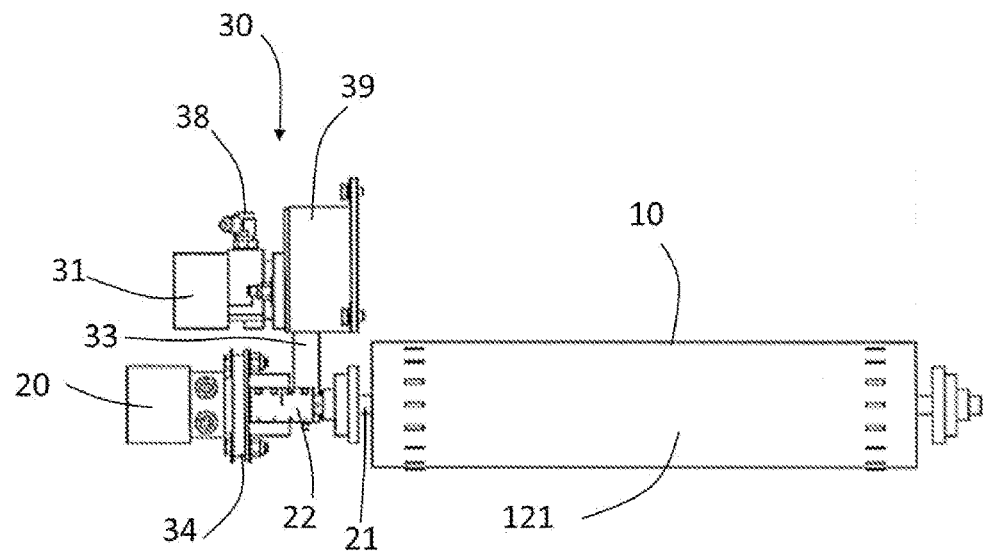
FIG. 4C is a partial front view of the conveyor system of FIG. 3.

FIGS. 4A-4C show various views of a section of the conveyor system 1 including the first end 121. FIG. 4A shows a top view of the conveyor system 1, showing the agitator assembly 30 with the agitator motor 31, hydraulic connections 38, and mounting frame 39. FIG. 4B shows a schematic side view of the first end 121 of the conveyor system 1. The agitator motor 31 is connected to a first link 33 that in turn is connected to a second link 34. The second link 34 further connects to the conveyor motor 20 that turns the axle 21 via the conveyor belt drive shaft 22. FIG. 4C shows an end view of the first end 121 of the conveyor system 1.

In the embodiment shown in FIGS. 5A-5E, the conveyor system 1 mounts to a frame 12. The frame 12 is used to mount the conveyor system 1 to the harvester 100 and can also help keep the harvested grapes 2 from falling off the sides or the first end 121 of the conveyor belt 10. For example, the frame 12 can surround the conveyor belt 10 on all four sides (see FIG. 5E). The mounting frame 39 of the agitator assembly 30 can be mounted onto the frame 12.

Figure 5A:
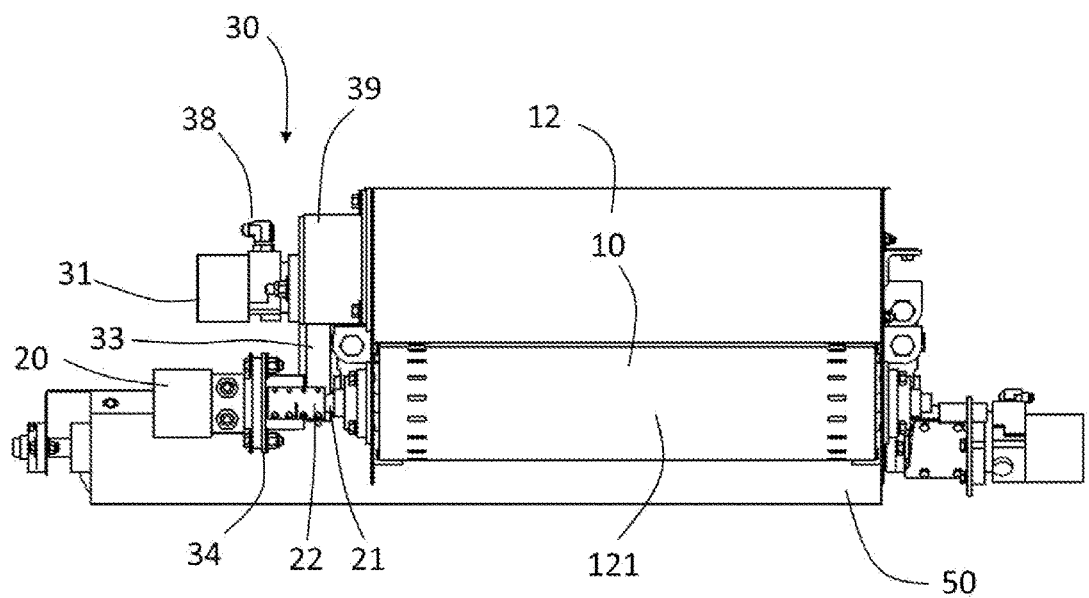
FIG. 5A is a front view of the conveyor system of FIG. 3.
Figure 5B:
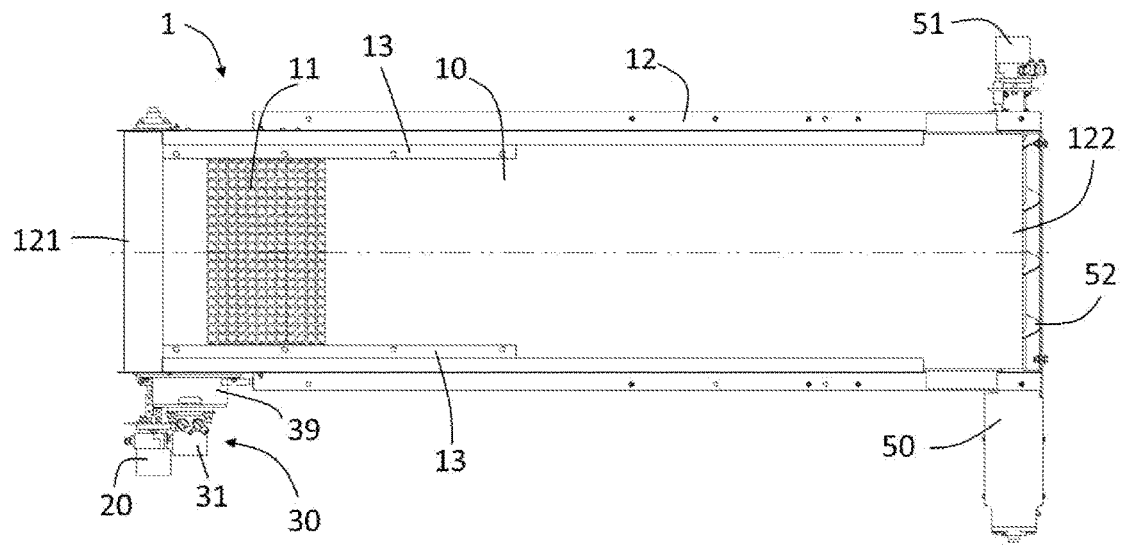
FIG. 5B is a top view of the conveyor system of FIG. 3.

As seen in FIG. 5B, the conveyor system 1 may also include an auger assembly 50 or other debris transport system adjacent the second end 122 of the conveyor belt 10. The auger assembly 50 can be located below the second end 122 and can be used to move MOG 3 away from the conveyor belt 10. The auger assembly 50 has an auger motor 51 connected to an auger 52. Guards 13 are disposed along the sides of the conveyor belt 10 adjacent to the first end 121, along the sides of the frame 12.

Figure 5C:
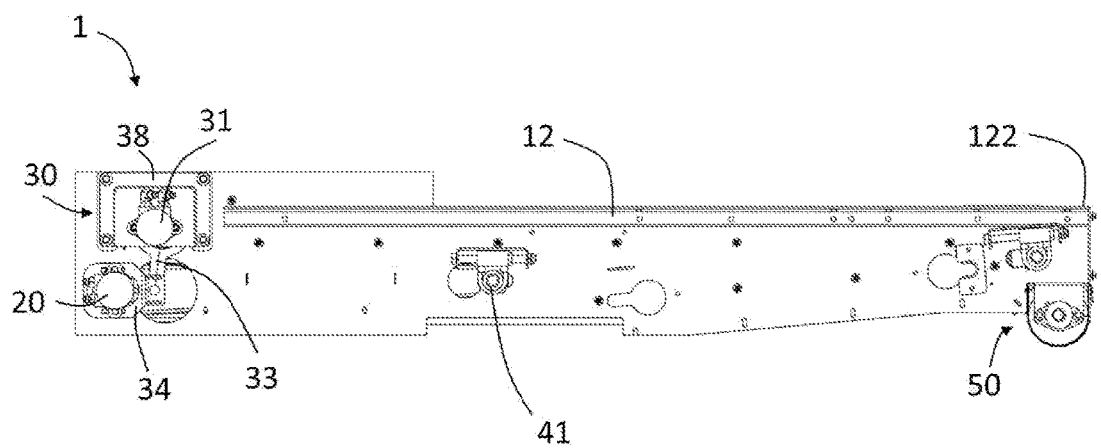
FIG. 5C is a side view of the conveyor system of FIG. 3.

FIG. 5C shows a side view of the conveyor system 1, including the frame 12. The auger assembly 50 can be seen under the frame 12 adjacent to the second end 122 of the conveyor system 1. A center axle 41 of an inner conveyor 40 (shown in FIG. 5D) is visible through an opening in the frame 12.

Figure 5D:
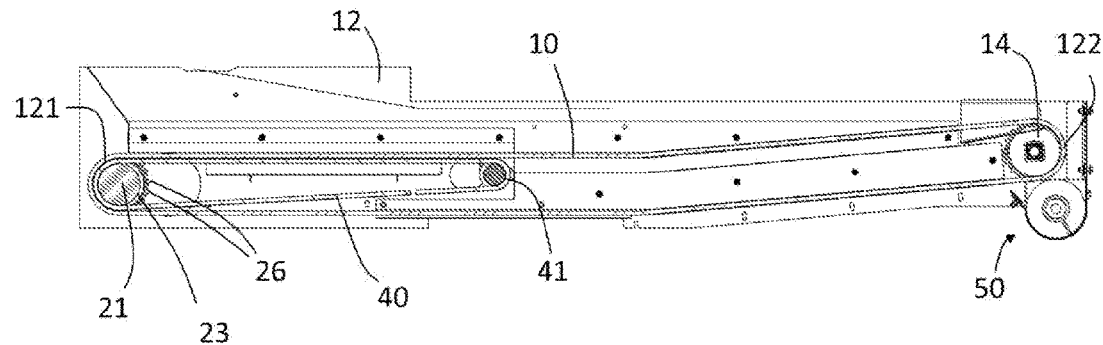
FIG. 5D is a cross sectional side view of the conveyor system of FIG. 3.

FIG. 5D shows a cross sectional view of the conveyor system 1. The conveyor motor 20 turns the axle 21 to rotate the conveyor belt 10 in an endless loop so that on the top side the conveyor belt 10 moves from the first end 121 toward the second end 122. On the bottom side the conveyor belt 10 moves from the second end 122 toward the first end 121. At the second end 122 the conveyor belt 10 turns around a second axle 14. The axle 21 can simultaneously turn an inner conveyor 40 in an endless loop between the axle 21 and the center axle 41. The inner conveyor 40 is a solid belt that is positioned immediately below the conveyor belt 10, covering or blocking the openings 11 and preventing grapes 2 from falling through the openings 11 along the length of the inner conveyor 40. This prevents grapes 2 from falling from the conveyor belt 10 prematurely before the conveyor belt 10 reaches the first fruit conveyor 133'.

Figure 5E:
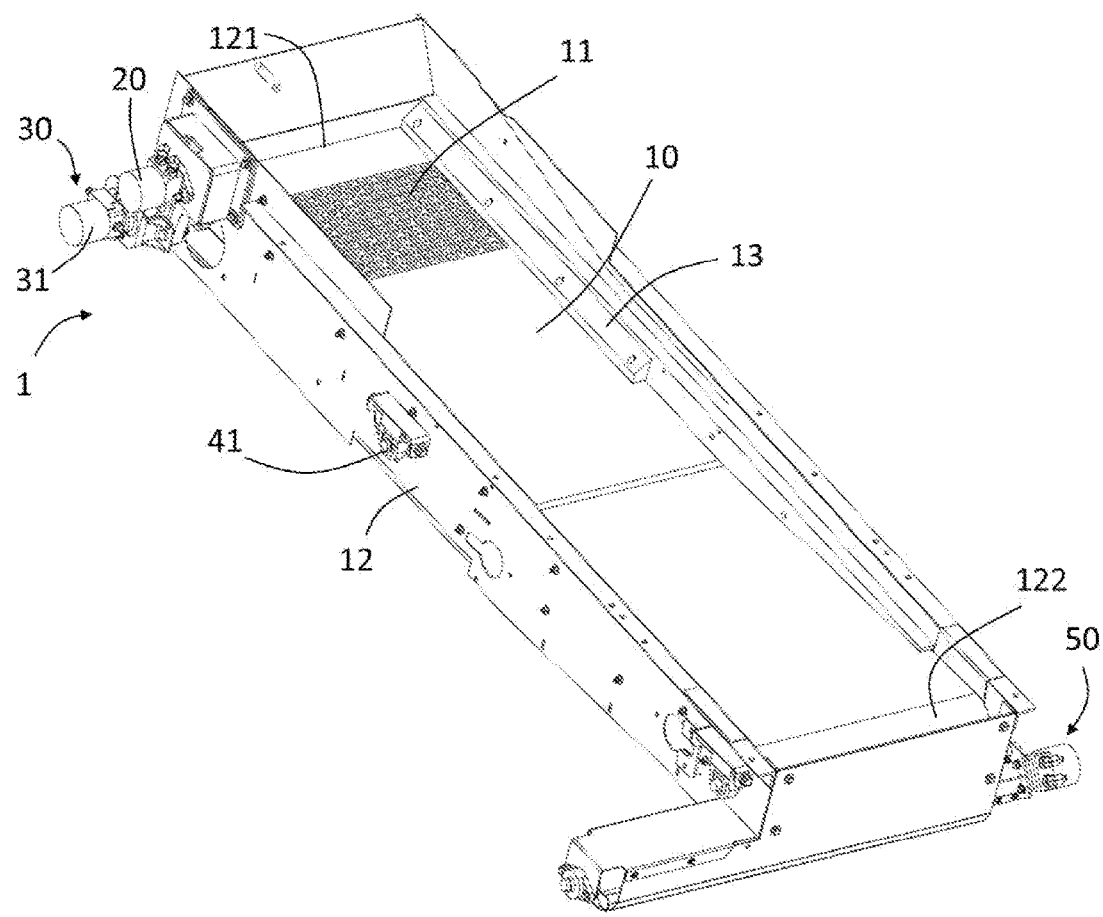
FIG. 5E is a perspective view of the conveyor system of FIG. 3.

FIG. 5E shows a perspective view of the conveyor system 1. In the embodiment shown, it can be seen that the frame 12 extends vertically above the top of the conveyor belt 10 and prevents grapes 2 and MOG 3 from falling off the sides of the conveyor belt 10. The conveyor belt 10 may have a slight upward incline toward the second end 122. As shown in FIG. 2, the conveyor belt 10 moves the grapes 2 and the MOG 3 along the conveyor belt path. The grapes 2 fall through the openings 11, while MOG 3 stays on the conveyor belt 10 until the conveyor belt 10 turns at second end 122 and drops any remaining material into the auger assembly 50. As can be seen in FIG. 5E, the guards 13 extend along the sides or the conveyor belt 10 approximately as far as the inner conveyor 40. In the embodiments shown, inner conveyor 40 is slightly narrower than the conveyor belt 10, and the guards 13 cover any openings 11 in the conveyor belt 10 along the length of the inner conveyor 40 that are not covered by the inner conveyor 40 from the underside.

Figure 6:
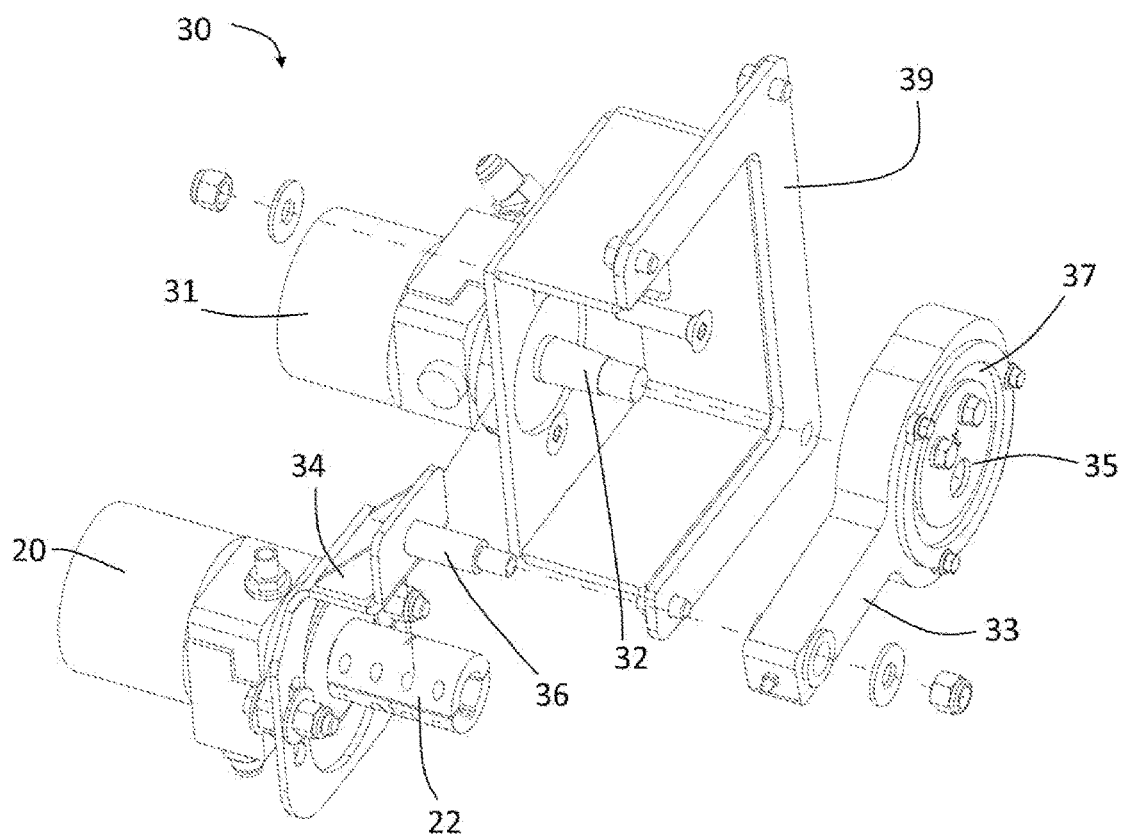
FIG. 6 is an exploded view of the agitator and drive assembly of the conveyor system of FIG. 3.

FIG. 6 shows an exploded view of the agitator assembly 30 connected to the conveyor motor 20. A drive shaft 32 of the agitator motor 31 is coupled with an eccentric element 35. The eccentric element 35 is rotatably coupled with the first link 33. The connection may include bearings 37. The first link 33 in turn couples with a second link 34 by a connector arm 36, the second link 34 being connected to the conveyor motor 20.

Figure 7A:
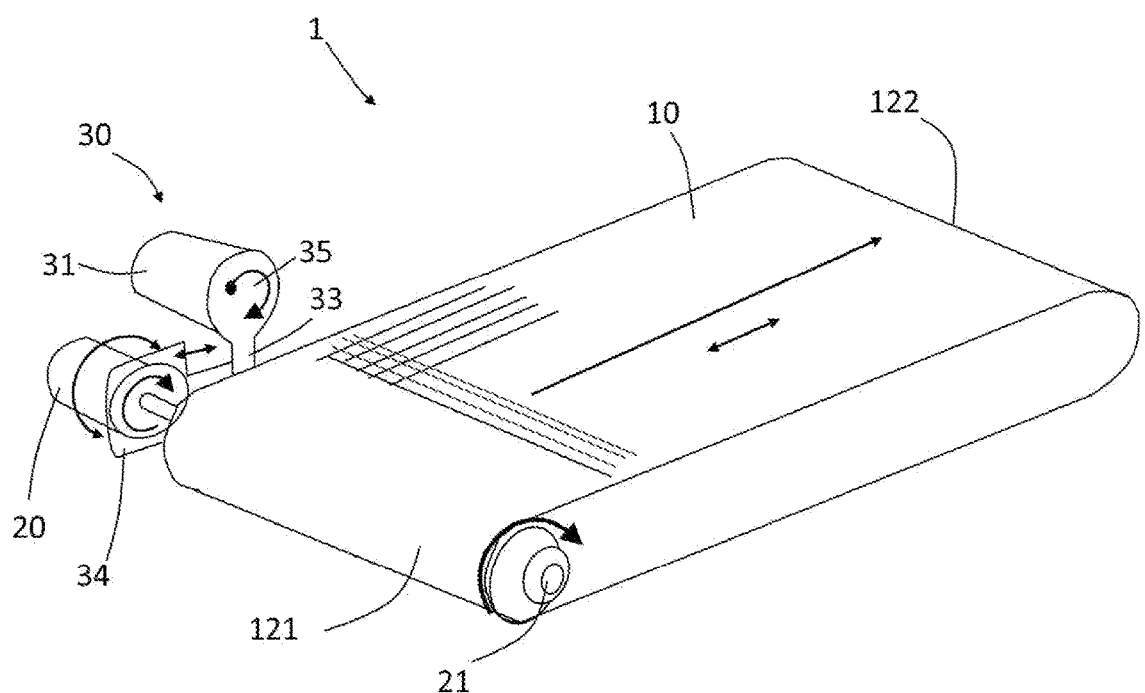
FIG. 7A is a schematic detail view of the conveyor system of FIG. 3 showing various motions of the agitator assembly.
Figure 7B:
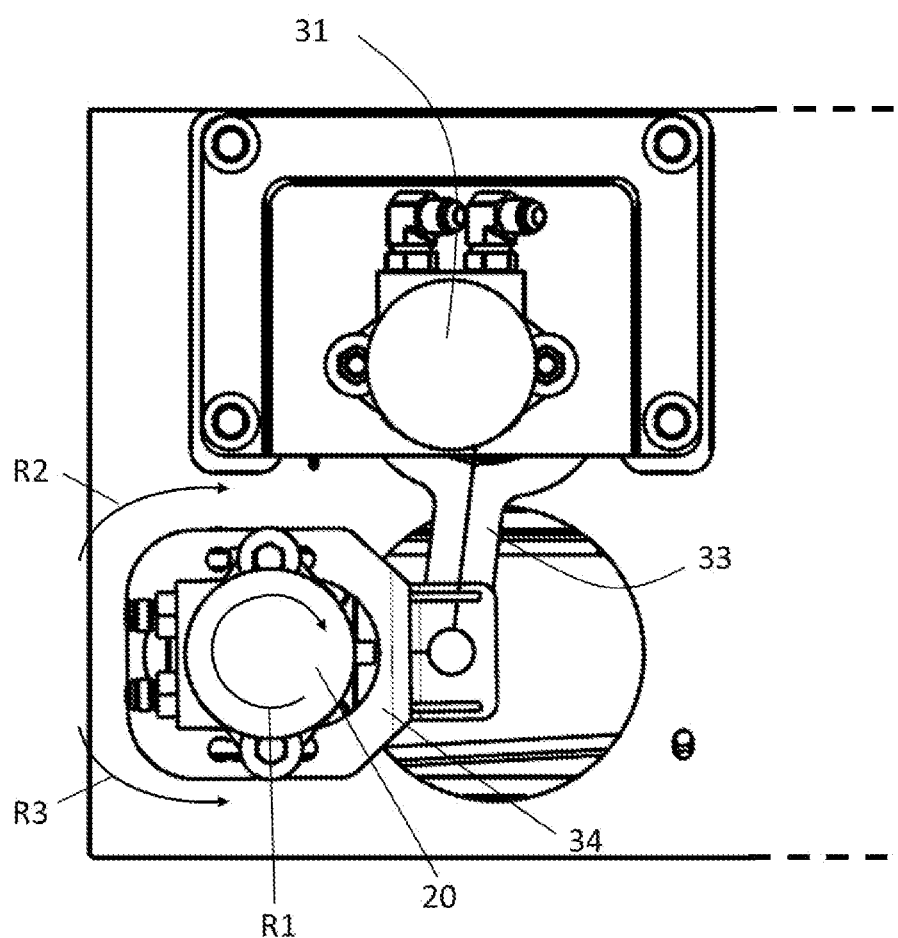
FIG. 7B is a schematic detail view of an end of the conveyor system of FIG. 3 showing various motions of the agitator assembly.

The agitation movement of the conveyor motor 20 is depicted in FIGS. 7A and 7B. Ordinarily, the housing of the conveyor motor 20 is stationary as the conveyor motor spins the belt drive shaft 22 and the conveyor axle 21. The agitator motor 31 imparts an additional motion that moves the conveyor motor 20 and causes a shaking or agitation of the conveyor belt 10. A rotational movement of the eccentric element 35 of the agitator assembly 30 causes the first and second links 33, 34 to move in a manner that, when connected to the conveyor motor 20, cause a reciprocating rotational movement of the conveyor motor 20. The reciprocating rotational movement of the conveyor motor 20 is further conveyed to the belt drive shaft 22 and transferred to a back-and-forth shaking motion of the conveyor belt 10, while maintaining an overall movement toward the second end 122.

FIG. 7B shows a schematic of the movement of the conveyor motor 20. The conveyor motor 20 spins the axle 21 in a rotational motion R1. The agitator motor 31 causes an alternating, coaxial rotational movement, alternating between R2 and R3. When the agitator motor 31 moves the conveyor motor 20 in the direction of R2 (which is in the same direction as R1), the motion causes an increase in the speed of the axle 21. However, when the agitator motor 31 moves the conveyor motor 20 in the direction of R3 (which is in the opposite direction of R1), the motion causes a decrease in the speed of the axle 21. The alternating increase and reduction in the speed of the axle 21 cause a shaking or agitating movement of the conveyor belt 10. The agitation aids in the sorting of grapes 2 from the MOG 3 by causing more grapes 2 to fall through the openings 11 in the conveyor belt 10, thus reducing losses in harvested grapes 2.

While certain embodiments of the invention have been described, other embodiments may exist. While the specification includes a detailed description, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. An over the row fruit harvester comprising:
   a chassis;
   a power source mounted on the chassis; and
   a conveyor system comprising:
      a conveyor frame mounted on the fruit harvester chassis;
      a conveyor arranged in a loop on the conveyor frame, the conveyor comprising a conveying direction, the conveyor defining a plurality of openings extending through the conveyor;
      a conveyor motor coupled to the conveyor frame and operably coupled with the conveyor by a belt drive shaft, the belt drive shaft comprising a first rotational axis perpendicular to the conveying direction and a rotational speed about the first rotational axis; and
      an agitator configured to agitate the conveyor motor, the agitator comprising:
         an agitator motor;
         an eccentric element, the agitator motor engaging the eccentric element to rotate the eccentric element about a second rotational axis parallel to the first rotational axis of the belt drive shaft; and
         a link having a first end and a second end, the first end being mounted to the eccentric element, and the second end being operatively coupled with the conveyor motor,
      wherein the agitator is configured to impart an alternating rotational movement to the conveyor motor about the first rotational axis.

2. The conveyor system of claim 1, wherein the link comprises a first link member and a second link member.

3. The conveyor system of claim 1, wherein the conveyor has a rotational speed, and wherein the agitator is constructed to alternately increase and decrease the conveyor's rotational speed.

4. The conveyor system of claim 1, wherein a portion of the plurality of openings are blocked by a second conveyor.

5. The conveyor system of claim 4, wherein the conveyor motor is operatively coupled with the second conveyor.

6. The conveyor system of claim 1, wherein the conveyor motor imparts a first rotational speed to the belt drive shaft in a first direction and the eccentric element of the agitator provides the conveyor motor alternatingly with a second rotational speed in the first rotational direction and a third rotational speed in a second rotational direction, wherein the second rotational direction is opposite of the first rotational direction, and wherein the belt drive shaft rotational speed is a sum of the first rotational speed and the second rotational speed or the first rotational speed and the third rotational speed.

7. The conveyor system of claim 1, wherein the agitator comprises an agitator frame, and wherein the conveyor frame and the agitator frame are independently mounted on the chassis.

8. The conveyor system of claim 1, wherein the conveyor comprises a conveyor belt.

9. A method for conveying crops on an over the row fruit harvester, the harvester including a chassis, a power source mounted on the chassis, and a conveyor defining a plurality of openings extending through the conveyor, a conveyor motor operably coupled with the conveyor by a belt drive shaft, and an agitator comprising:
- an agitator motor;
- an eccentric element, the agitator motor engaging the eccentric element to rotate the eccentric element; and
- a link having a first end and a second end, the first end being mounted to the eccentric element, and the second end being operatively coupled with the conveyor motor;

the method comprising:
- driving the conveyor by rotating the belt drive shaft in a first rotational direction; and
- at the same time operating the agitator motor to impart an alternating rotational motion to the conveyor motor alternating in the first rotational direction and a second rotational direction opposite of the first rotational direction.

10. The method for conveying of claim 9, wherein the conveyor motor imparts a rotational speed to the conveyor, the method comprising alternately increasing and decreasing the conveyor rotational speed.

11. The method of claim 9, wherein the conveyor motor imparts a first rotational speed to the belt drive shaft in a first direction and the eccentric element of the agitator alternatingly applies to the conveyor motor a second rotational speed in the first rotational direction and a third rotational speed in a second rotational direction, wherein the second rotational direction is opposite of the first rotational direction, and wherein the belt drive shaft rotational speed is a sum of the first rotational speed and the second rotational speed or the first rotational speed and the third rotational speed.

12. An over the row fruit harvester,
comprising: a chassis;
a power source;
a shaker assembly mounted on the chassis and configured to engage plants;
and a conveyor system mounted on the chassis, the conveyor system comprising:
a conveyor frame mounted on the chassis;
a conveyor arranged in a loop on the conveyor frame and defining a plurality of openings extending through the conveyor;
a conveyor motor coupled to the conveyor frame and operably coupled with the conveyor by a belt drive shaft, the belt drive shaft comprising a rotational axis perpendicular to the conveying direction and a rotational speed about the rotational axis; and
an agitator configured to agitate the conveyor motor, the agitator comprising:
an agitator motor;
an eccentric element, the agitator motor engaging the eccentric element; and
a link having a first end and a second end, the first end being mounted to the eccentric element, and the second end being operatively coupled with the conveyor motor,
wherein the agitator is configured to impart an alternating rotational movement to the conveyor motor about the rotational axis.

* * * * *